(12) United States Patent
Williams et al.

(10) Patent No.: US 10,471,935 B2
(45) Date of Patent: Nov. 12, 2019

(54) COWL LOUVER ASSEMBLY WITH MODULAR ICE SCRAPERS

(71) Applicant: Toyota Motor Engineering & Manufacturing North America, Inc., Erlanger, KY (US)

(72) Inventors: Paxton S. Williams, Milan, MI (US); Scott L. Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 43 days.

(21) Appl. No.: 15/819,441

(22) Filed: Nov. 21, 2017

(65) Prior Publication Data
US 2019/0152441 A1 May 23, 2019

(51) Int. Cl.
*B60S 1/04* (2006.01)
*B62D 25/08* (2006.01)
*B60S 3/04* (2006.01)
*B62D 35/00* (2006.01)

(52) U.S. Cl.
CPC ............ *B60S 1/0402* (2013.01); *B60S 3/045* (2013.01); *B62D 25/081* (2013.01); *B62D 35/00* (2013.01)

(58) Field of Classification Search
CPC ........................... B60S 1/0402; B62D 25/081
USPC ........................................................ 296/192
See application file for complete search history.

(56) References Cited

U.S. PATENT DOCUMENTS

| 5,716,091 | A | 2/1998 | Wieczorek | |
|---|---|---|---|---|
| 6,565,148 | B1* | 5/2003 | Teramoto | B62D 25/081 180/69.2 |
| 6,763,546 | B1 | 7/2004 | Smith | |
| 8,002,335 | B2* | 8/2011 | Usuda | B62D 25/081 296/187.04 |
| 9,352,702 | B2 | 5/2016 | Leo | |
| 9,421,947 | B2 | 8/2016 | Wilgosz | |
| 9,775,429 | B2* | 10/2017 | Gravelle | A46B 15/0081 |
| 2003/0107243 | A1* | 6/2003 | Hayashi | B62D 25/081 296/192 |

(Continued)

FOREIGN PATENT DOCUMENTS

| DE | 4034848 A1 | 5/1992 |
|---|---|---|
| DE | 102006031992 A1 | 1/2008 |
| DE | 10 2011 118 329 | * 5/2013 |

OTHER PUBLICATIONS

English Abstract of DE 11 2011 118 329 (Year: 2013).*

*Primary Examiner* — Joseph D. Pape
(74) *Attorney, Agent, or Firm* — Dinsmore & Shohl LLP

(57) ABSTRACT

A vehicular cowl louver assembly, a vehicular windshield assembly and a vehicle. A cowl louver that makes up a portion of the vehicular cowl louver assembly has one or more recesses formed in an upper-facing surface with which to provide storage of an ice scraper. A resiliently-biased clip allows the ice scraper to be selectively removable from the cowl louver to enable a person to scrape ice, snow or other debris from a vehicular windshield. The ice scraper may be returned to the recess after use, where the clip keeps the two secured to one another, even during vehicular movement. In one form, the surface of the ice scraper may be made to form a substantially flush, continuous fit with the portion of the surface of the cowl louver that is adjacent the recess to improve aerodynamic and aesthetic features of the cowl louver assembly.

20 Claims, 3 Drawing Sheets

(56) References Cited

U.S. PATENT DOCUMENTS

2017/0057463 A1  3/2017  Yamamoto

* cited by examiner

COWL LOUVER ASSEMBLY WITH MODULAR ICE SCRAPERS

TECHNICAL FIELD

The present specification generally relates to cowl louver structures and vehicles that include such structures, and more particularly to a cowl louver assembly that incorporates an ice scraper into the design of the cowl louver for convenient storage and use.

BACKGROUND

In automobiles, sport utility vehicles, pickup trucks, minivans and related vehicles, a cowl louver and its underlying cowl panel or related component act together to provide a structural coupling and aerodynamic fairing for an exterior region of the vehicle that is situated between a hood that covers a forward engine compartment and a windshield that provides passenger compartment isolation. One function of the cowl louver is to provide management of the air and water that is present in the ambient environment that is adjacent the forward engine and passenger compartments. By way of example, one or both of the cowl louver and the cowl panel include shaped troughs or related liquid flowpaths to convey accumulated water away from the hood, windshield and other parts of the vehicle. Relatedly, one or both of the cowl louver and the cowl panel may include ducts or related air flowpaths to introduce ambient air to the passenger compartment. Moreover, one or both of the cowl louver and the cowl panel may include sealing features in order to provide fluid isolation between the atmosphere that is present in the engine and passenger compartments. In addition, the placement of the cowl louver is such that is may provide one or more of a mounting location or pivot point for one or more motorized windshield wiper units and windshield wiper spray ports both of which are used to provide windshield cleaning functions.

Conventional ice scrapers are used for clearing ice, snow and debris from the windshield and surrounding glass parts of a vehicle. Typically there is no storage for this item in or on the vehicle that is both convenient and secure, which in turn leads to the scraper often being lost or misplaced.

SUMMARY

In one embodiment, a vehicular cowl louver assembly includes a cowl louver with one or more recesses formed therein, a resiliently-biased clip and a detachable ice scraper. The ice scraper is cooperative with the one or more recesses to allow removal from or attachment to the recesses through the clip, which in turn promotes selective engagement and disengagement of the ice scraper to the cowl louver.

In another embodiment, a vehicular windshield assembly includes a windshield and a cowl louver assembly, where the cowl louver assembly includes a cowl panel and a cowl louver disposed relative to the cowl panel and cooperative therewith such that one or both the cowl louver and the cowl panel may be secured to a vehicle. The cowl louver defines one or more recesses formed therein that are sized and shaped to accept the placement of a detachable ice scraper that when situated within the recess can be held in place by a resiliently-biased clip that is formed on at least one of the cowl louver and the ice scraper.

In another embodiment, a vehicle includes a wheeled chassis that defines a passenger compartment therein. The vehicle further includes a motive power unit, a guidance apparatus cooperative with the wheeled chassis and motive power unit, a windshield that at least partially defines the passenger compartment and a cowl louver assembly that includes a cowl panel and a cowl louver with one or more recesses formed therein with which to accept the selective placement of a detachable ice scraper. A resiliently-biased clip permits the selective attachment and detachment of the ice scraper from the recess.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicular cowl louver assemblies, vehicular windshield assemblies and vehicles according to the present disclosure include cowl louver structure that is located between a front windshield and the hood that is used to cover an engine bay or other forward vehicular compartment. The cowl louver that forms a part of the assembly includes a recess formed in an upper surface that extends across the width of the windshield or hood such that one or more ice scrapers may be stored in the recess during periods where the ice scraper is not being used, as well as allowing for ease of removal during periods where use of the ice scraper is desired. In one particular form, a visually outward-facing shape of the ice scraper substantially matches a corresponding adjacent shape of the portion of the cowl louver that surrounds the recess, and is sized such that a resiliently-biased snap-fit connection may be formed between them. In this way, the exposed surface of the ice scraper defines a blended (or faired-in) shape so as to not detract from the vehicle overall aesthetic appearance or aerodynamic profile. In one form, the scraper may include—in addition to a hard blade or edge for scraping ice—a brush for sweeping away snow. The snap-fit connection helps the ice scraper to remain securely in place during periods where the scraper is not being used, as well as promote too-free ease of removal of the ice scraper when its use is desired.

Figure 1:
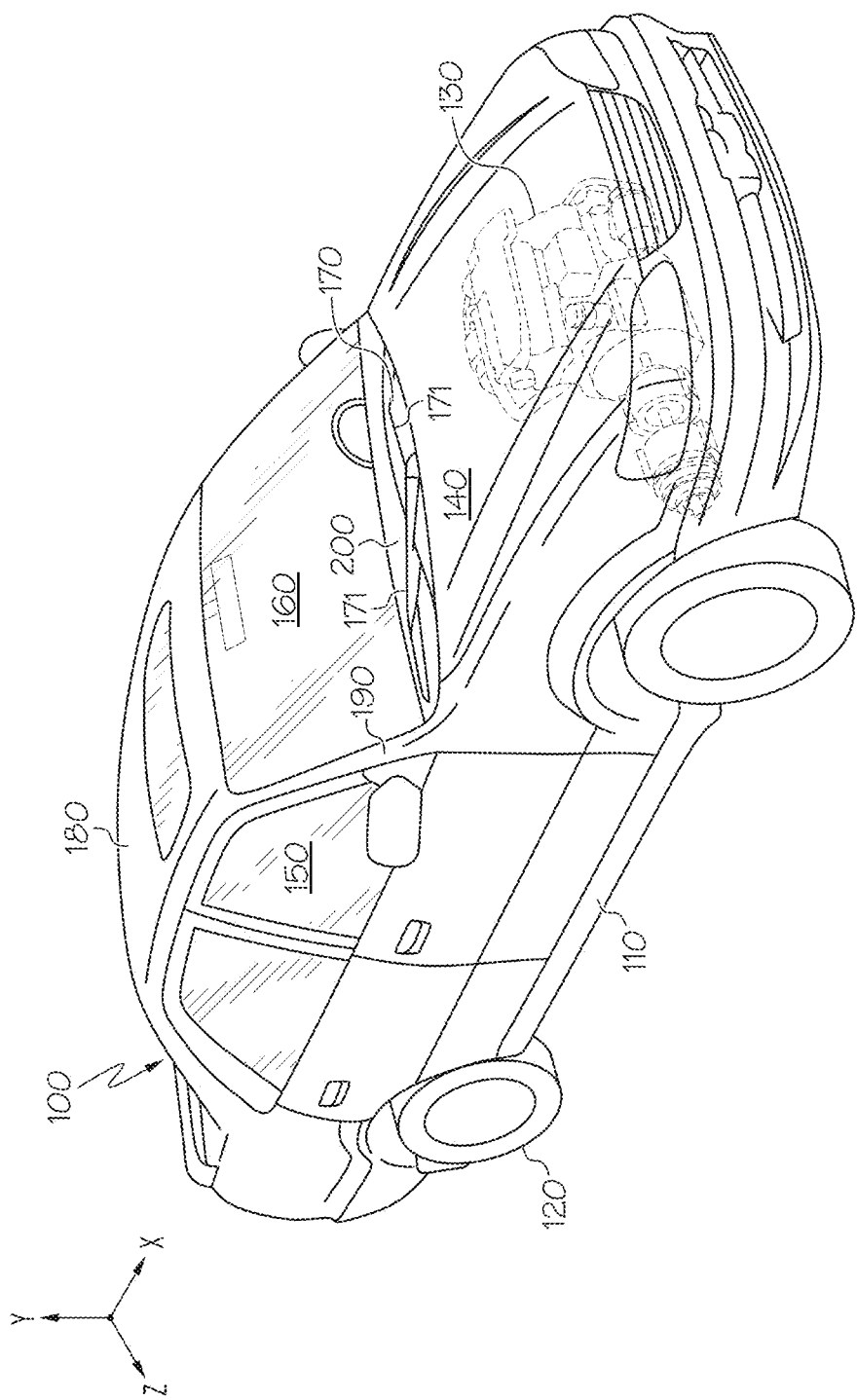
FIG. 1 schematically depicts a perspective view of a vehicle that includes a cowl louver assembly with one or more modular ice scrapers according to one or more embodiments shown or described herein.

Referring initially to FIG. 1, a motor vehicle (hereinafter vehicle) 100 is shown in space where the Cartesian coordinates include orthogonal directions associated with the vehicle's respective horizontal longitudinal, horizontal lateral and vertical height axes X, Y and Z. As such, the lengthwise dimension of vehicle 100 is collinear with the longitudinal axis X, while the height dimension of the vehicle 100 is collinear with the height axis Y and the widthwise dimension of the vehicle 100 is collinear with the lateral axis Z. Accordingly, reference to a particular component or portion thereof—as well its orientation along or movement within a particular dimension—will be understood to be within the context of the Cartesian coordinates discussed herein, and that slight deviations from the same due to minor misalignment of such components relative to such a spatial reference system are permissible without any loss in generality. Moreover, all such alignments relative to such a coordinate system are deemed to be within the scope of the present disclosure.

The vehicle 100 includes a chassis 110 with a plurality of wheels 120 at least one of which is configured as a driving wheel to propel the vehicle 100 upon receipt of suitable motive power. Chassis 110 may either be of body-on-frame or unibody construction, and both configurations are deemed to be within the scope of the present disclosure. Moreover, while the particular vehicle 100 configuration depicted is a four-door sedan, it will be appreciated that other vehicular forms, including coupes, sport utility vehicles (SUVs), pickup trucks, minivans or the like are also within the scope of the present disclosure. A motive power unit 130 that may be configured as a conventional internal combustion engine (ICE), battery pack, fuel cell stack or a hybrid combination of one or more of the above may be situated in or on the chassis 110 to provide a source of torque or propulsive power to the vehicle 100. In one form, the motive power unit 130 is situated in a forward compartment that is covered with a hood 140. A passenger compartment 150 is formed inside the chassis 110 and serves not only as a place to transport passengers and cargo, but also as a place from which a driver may operate vehicle 100 through one or more of a steering wheel, accelerator (or throttle) pedal, brake pedal and shifter (none of which are shown) through cooperation with the wheels 120, motive power unit 130, transmission (not shown) and other systems. A windshield 160 is provided at a forward end of the passenger compartment 150, and in one form extends over a substantial entirety of the widthwise dimension of the vehicle 100 along the lateral axis Z. A windshield wiper unit 170 with one or more corresponding blades 171 is mounted between the hood 140 and the windshield 160 in order to clear rain, snow, dirt or debris the collects on the windshield 160. The windshield 160 is bounded at its upper edge by a roof 180, on its lateral side edges by pair of A-pillars 190 and at its lower edge by a cowl louver assembly 200 that is situated between the hood 140 and the windshield 160.

Figure 2:
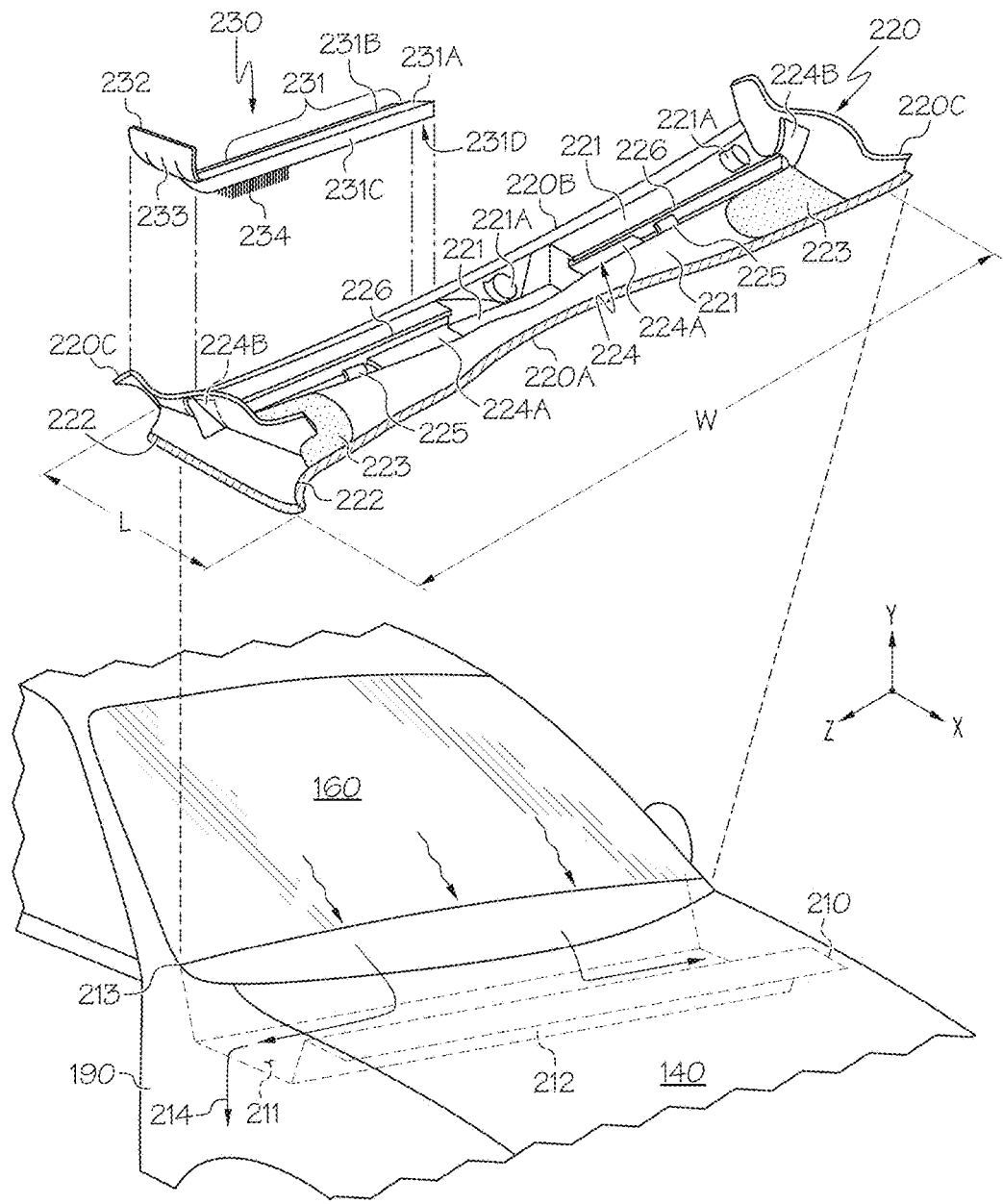
FIG. 2 depicts an exploded, perspective view of the cowl louver assembly with and a modular ice scraper according to one or more embodiments shown or described herein.

Referring next to FIG. 2 in conjunction with FIG. 1, the cowl louver assembly 200 is shown in FIG. 2 in exploded view. The cowl louver assembly 200 includes a cowl panel 210 that defines a primary structural body for attachment or related securing of a cowl louver 220 that in turn provides a selective mounting location for an ice scraper 230. Within the present context, the terms "cowl assembly" and "cowl louver assembly" may be used interchangeably, and that the context will make it clear whether such assembly does or does not include the cowl panel 210. As shown, the cowl panel 210 is disposed beneath the cowl louver 220 when being viewed from above along the height axis Y.

In one form, at least one of the cowl panel 210 and the cowl louver 220 may be formed as a unitary structure from a resin-based material such as polypropylene (PP) or some other suitable rigid, impact-resistant, water-resistant, temperature-resistant, sunlight-resistant material or the like. In one form, such unitary structure may be made by injection molding, including two-shot injection molding in situations where more than one material may be used. In another form, at least one of the cowl panel 210 and the cowl louver 220 may be formed as disparate structures from more than one components from one or more resin-based materials. By way of example, the cowl panel 210 may include separate front, back, lower and upper subpanels with which to define larger panel portions that each may be secured to an adjacent part of the chassis 110, cowl louver 220 or other structure, depending on the configuration of the vehicle 100. As shown, both the cowl panel 210 and the cowl louver 220 are elongated along the widthwise dimension W of the vehicle 100 that generally coincides with the lateral axis Z. The cowl panel 210 and cowl louver 220 also define a length L that corresponds to the longitudinal axis X of vehicle 100 and that is shorter than the widthwise dimension W, although either or both of the cowl louver 220 or the cowl panel 210 may be longer along such length L, depending on the configuration of the vehicle 100. In one form, the cowl panel 210 and the cowl louver 220 may be made as separate components and then secured together through fasteners, welding, adhesives, clips or other joining techniques. For example, the cowl louver 220 may be mounted on the cowl panel 210 such that together they provide an interconnect between a lower edge of the windshield 160 and the hood 140, as well as to the chassis 110, body panels or other suitable structural mount on vehicle 100. As with the securing between the cowl panel 210 and the cowl louver 220, one or both of these components may be joined to such vehicular structure through the use of similar fasteners, welding, adhesives, clips or related connecting devices (not shown), while seals and related components may be used to provide air or water isolation between adjacent vehicular compartments, as well as for vibration isolation.

The cowl panel 210 defines a trough-like cross-sectional portion 211 between a cowl panel front edge 212 and a cowl panel rear edge 213. In addition, various lips, flanges or related surfaces may be formed therein to act as mounting location for the cowl louver 220, as well as for attachment points to the other structure within vehicle 100 previously mentioned. In one form, a least a portion of the trough-like structure defines one or more pathways 214 that may be defined in a lower portion thereof with which to convey away water than has accumulated on the hood 140, windshield 160, roof 180 and other upper parts of the vehicle 100. In addition, the cowl panel 210 may have various apertures or gaps formed therein, some of which may be used as a passageway that permits ambient air to be selectively introduced into the passenger compartment 150. Additional apertures, mounting surfaces and other features may be formed to facilitate the placement or support of portions of the wiper units 170 (such as wiper motors or the like) or other vehicular components. Yet another function of the cowl panel is to route draining water (such as from rain, car washing or the like) from the roof 180 and A-pillars 190 to the ground, as well as to keep such drained water separate from air that is being introduced into the passenger compartment 150 from the ambient environment. In one form, an aperture or apertures formed in the cowl panel 210 (as well as in the cowl louver 220) may be used as a water drain.

The cowl louver 220 defines an upper surface 221 that is formed as a generally V-shaped or U-shaped groove with various undulated sections. As with one form of the cowl panel 210, one form of the cowl louver upper surface 221 includes a gutter-like shape that is open to the vehicle 100 upper side in order to facilitate the capture and conveyance of water. In addition, the cowl louver upper surface 221 may include one or more geometric features that may be used as component mounting locations, component attachment locations or for increases in structural rigidity. Within the cowl louver upper surface 221, one example of such a geometric feature may be one or two upwardly bulged seat portions 221A that may act as locations where the corresponding wiper unit (or units) 170 may be situated. As can be seen, the cowl louver upper surface 221 defines a region along the longitudinal axis X of vehicle 100 between a front edge 220A, rear edge 220B and side edge 220C of cowl louver 220. In one form, the cowl louver front edge 220A is shaped to be positioned underneath the hood 140 while the cowl louver rear edge 220B is shaped to be positioned to engage a forward lower edge of the windshield 160, and may in one form also be at least partially positioned underneath such windshield 160 forward lower edge. By such construction, the cowl louver upper surface 221 becomes a generally upper-facing and outward-facing component relative to the cowl panel 210 in order to define a closure between the windshield 160 and hood 140 that provides a measure of exterior visual and aerodynamic continuity to vehicle 100. The cowl louver 220 may also include one or more seals 222 that are attached or otherwise formed about some or all of the outer perimeter of the cowl louver 220 to provide additional water isolation and channeling functions, as well as vibration isolation or improved mounting. For example, the seals 222 may be formed along the side edge 220C of the cowl louver 220 that corresponds to a fender side seal, as well as along the cowl louver front edge 220A (both as shown in FIG. 2) and the cowl louver rear edge 220B. Likewise, the seals 222 may additionally form hood seals, windshield seals or the like. For example, placing a hood seal on the cowl louver front edge 220A allows a substantially air-tight isolation formed between the motive power unit 130 that is disposed within a respective engine compartment under the hood 140 (in front-engine configurations of vehicle 100) and the passenger compartment 150 that is situated behind the windshield 160. In one form, each of the seals 222 may be made from a compliant material such as a thermoplastic elastomer that can be elastically deformed when loaded, such as under the weight of windshield 160.

In one form, the cowl louver 220 is sized and shaped to cover a wiper motor (not shown) that may be situated underneath the upwardly bulged seat portions 221A, where the motor makes up a part of the wiper unit or units 170 that may include one or more corresponding wiper pivots, wiper arms and wiper links that cooperate to transmit a rotational torque of the wiper motor in order to drive the wiper blades 171. It will be appreciated that in configurations where a single, eccentric windshield wiper blade 171 is employed, only one such wiper unit 170 and corresponding upwardly-bulged seat portion 221A may be formed in the cowl louver 220, and that both one-blade and two-blade variants are deemed to be within the scope of the present disclosure. Other components, such as ducting (not shown) for the conveyance of external, ambient air that is received through a mesh-like set of apertures (also referred to herein as air passage apertures) 223 may also be disposed underneath or behind the cowl louver 220, and as such may accompany the formation of other geometric features formed in the cowl louver upper surface 221. In such a configuration, the mesh-like set of apertures 223 may be formed to allow the passage of ambient air into the passenger compartment 150 in a manner similar to—or in cooperation with—the underlying cowl panel 210. In one form, and upon movement of the vehicle 100, such ambient air can be directed from outside the vehicle 100 into the mesh-like set of apertures 223 and through such ducting, while the mesh-like apertures 223 may be formed as a repeating matrix of small-dimension holes, as slots elongated in the vehicle 100 longitudinal axis, or any other form suitable for facilitating the relatively free flow of air from a region outside the vehicle 100 to the passenger compartment 150 for use with a vehicular heating, ventilation and air conditioning (HVAC) system (not shown).

One or more recesses 224 with which to selectively store the corresponding ice scraper 230 are formed within the cowl louver upper surface 221. In one form, the recess (or recesses, depending on the configuration) 224 may include various sections or regions that have profiles that are sized and shaped to correspond to various portions of the ice scraper 230, such as a handle 231 and scraper edge 232. In such case, these sections or regions may define a generally rectangular recess horizontal profile 224A, as well as a generally rectangular recess vertical profile 224B. Within the present context, the term "recess" generally corresponds to the entirety of recess 224, while the terms "recess horizontal profile" and "recess vertical profile" correspond to the constituent portions of recess 224, and that the use of one or the other will be apparent from the context. In one form, the recess horizontal profile 224A is similar in size and shape to the handle 231, while the recess vertical profile 224B is similar in size and shape to the scraper edge 232, both to allow the selective placement of the ice scraper 230 into the recess 224. In such configuration, when the ice scraper 230 is stored within the recess 224, the elongate dimension of both extends along the widthwise dimension W of the cowl louver 220. In particular, the shape of the cowl louver upper surface 221 is such that it may form a substantially flush, faired-in profile with the ice scraper 230 once the ice scraper 230 is secured into the recess 224 with one or more elastically-biased (or resiliently-biased) clips 225. In one form, the resiliently-biased clips 225 are arranged in a tab-like manner along the elongate dimension of the recess 224 such that they form a slight interference fit with the handle 231 of the ice scraper 230. In one form as shown, the resiliently-biased clips 225 are integrally formed with the cowl louver 220 (such as by the aforementioned injection molding) in order to define a unitary cowl louver 220 structure. In another form (not shown), the resiliently-biased clips 225 are integrally formed with the handle 231 of the ice scraper 230 (also by the aforementioned injection molding) in order to define a unitary ice scraper 230 structure. Moreover, the resiliently-biased clips 225 may be attachedly formed with either the handle 231 or the cowl louver upper surface 221 such that the resiliently-biased clips 225 are initially fabricated as a separate component that is subsequently joined to a surface of the respective handle 231 or the cowl louver upper surface 221. Each of these variants are deemed to be within the scope of the present disclosure. Likewise, and regardless of which of the cowl louver 220 and the ice scraper 230 forms an attachment, affixing, securing or related mounting location for the resiliently-biased clips 225, the resiliently-biased clips 225 are made to cooperate with the recess 224 in order to achieve the selective attachment and detachment of the ice scraper 230 to and from the recess 224 through operation of the resiliently-biased clip 225. As such, placement of the resiliently-biased clip or clips 225 need not necessarily be within the recess 224 in order to have it be cooperative with the recess 224, but may also be adjacent the recess 224 on the cowl louver upper surface 221 or on handle 231 as previously discussed.

In one form, one or more apertures may be formed in a lower portion of the recess 224 in order to provide a water drain; such water drain may help with water collection and management in situations where rainwater, melting snow or ice or other water that may otherwise accumulate in the recess 224. In one form, the cowl louver 220 may include two recesses 224 (as shown), while in another form, the cowl louver 220 may include a single recess 224; both forms are deemed to be within the scope of the present disclosure. Thus, in configurations of the cowl assembly 200 that has an additional recess 224 defined within the cowl louver 220 and an additional detachable ice scraper 230, the additional ice scraper 230 may be made to be selectively removable from the additional recess 224 through operation of an additional resiliently-biased clip 225 in a manner similar to that previously described.

In addition, placement of the one or more recesses 224 within the upper surface of the cowl louver 220 may be made to accommodate other features such as the wiper unit (or units) 170, seals 222, mesh-like set of apertures 223 or the like. Regardless of the placement and number of recesses 224 and the placement and number of the resiliently-biased clips 225, they cooperate together such that the ice scraper 230 is detachable and attachable to a recess 224 by overcoming the elastic bias formed in the one or more resiliently-biased clips 225 by an amount that a partial closure of the recess 224 caused by such elastic bias is opened up in an amount sufficient to allow the relatively free passage of the ice scraper 230 into or out of the recess 224. Within the present context, such partial closure does not necessarily imply significant, majority or near-complete closure of an opening defined by such recess, but rather that the closure is sufficient to hold the ice scraper 230 in place within the recess 224 during periods of ice scraper 230 storage. Thus, the selective removal of or placement of the ice scraper 230 within the recess 224 takes place through the operation of the resiliently-biased clip 225 in such a manner that—depending on whether such resiliently-biased clip 225 is mounted on a portion of the cowl louver upper surface 221 that is adjacent the recess 224 or on the ice scraper 230—promotes movement and consequent disengagement of the resiliently-biased clip 225 and the respective surface of the ice scraper 230 and cowl louver upper surface 221. Within the present context, one form of such operation is through the elastic deformation of the resiliently-biased clip 225 by an amount sufficient to enlarge the partial closure of the recess 224 by an amount sufficient to permit the generally uninhibited insertion or removal of the ice scraper 230, but not so much that it results in either plastic deformation or breakage of with the resiliently-biased clip 225 or the corresponding part of the cowl louver upper surface 221 or ice scraper 230 to which the resiliently-biased clip 225 is attached.

The ice scraper 230 includes an elongate handle 231, scraper edge 232 with optional ribs 233 that may provide additional structural rigidity, and brush 234. In one form, the ice scraper 230 is made as a unitary structure from a resin-based material such as PP, high-density polyethylene (HDPE), low-density polyethylene (LDPE) or other suitable rigid, impact-resistant, water-resistant, temperature-resistant, sunlight-resistant material. As will be shown in conjunction with FIGS. 3 and 4, in one form, the handle 231 defines a modified rectangular cross section at its proximal end that is sized to be easily gripped by a human hand. In particular, the modified rectangular cross section defines an upper-facing surface 231A first plateau region, upper-facing surface 231B second plateau region, side-facing surface 231C and lower-facing surface 231D. As shown, when the ice scraper 230 is stored within the corresponding recess 224, the upper-facing surface 231A first plateau region projects in an upward direction along the height axis Y more than the upper-facing surface 231B second plateau region, although other variations are deemed to be within the scope of the present disclosure. Likewise, the modified rectangular shape of the handle 231 transitions to the blade-like scraper edge 232 at the distal end of the handle 231. As will become apparent from recourse to the view depicted in FIG. 2, the meaning of a surface as being upper-facing or lower-facing when used in conjunction with the ice scraper 230 corresponds to the spatial reference established when the ice scraper 230 is stored within the corresponding recess 224 that is formed within the cowl louver upper surface 221. In a similar manner, the brush 234 is seen to be formed from numerous bristles to extend from the lower-facing surface 231D into the recess 224.

Figure 3:
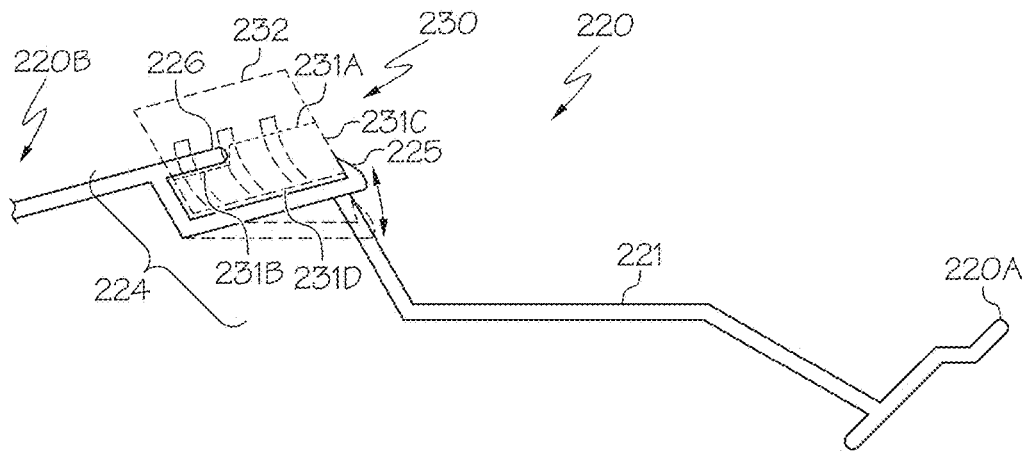
FIG. 3 depicts an edgewise section view of a portion of the cowl louver assembly of FIG. 2 including a modular ice scraper selectively secured to a recess formed therein according to one or more embodiments shown or described herein.

Referring next to FIG. 3, cooperation between the cowl louver 220 and the ice scraper 230 is shown in more detail. Because the combined profile of the upper-facing surface 231A first plateau region and upper-facing surface 231B second plateau region of the handle 231 and the scraper edge 232 are not coplanar with one another within the X-Z plane, achievement of a flush fit of the ice scraper 230 over a substantial entirety of the cowl louver upper surface 221 that is adjacent the recess 224 can be promoted through forming surface features within such adjacent portion that match the corresponding parts of the ice scraper 230 when it is in its stored position. In one form, such surface features may include a generally planar adjacent region for the portion of the cowl louver upper surface 221 that abuts the upper-facing surface 231A first plateau region and at least partially covers the upper-facing surface 231B second plateau region of the handle 231 the latter of which may be embodied through a cantilevered lip 226 that extends over a volumetric space occupied by the upper-facing surface 231B second plateau region of the stored handle 231. In one form, this cantilevered lip 226 may be integrally formed as part of the cowl louver 220 in order to help nest the handle 231 within the recess 224. In particular, the forward-projecting construction of the cantilevered lip 226 provides an enhanced degree of elastic flexibility that makes insertion and removal of the ice scraper 230 easier.

The generally planar adjacent region for the portion of the cowl louver upper surface 221 that abuts the handle 231 gives way to an upwardly-swept side wall in the shape of the upturned side edge 220C (shown in FIGS. 2 and 4) at a laterally outward location in the cowl louver upper surface 221. The angular orientation of the upwardly-swept side wall that forms a laterally inward-facing surface of the upturned side edge 220C is made to generally correspond with the angular orientation defined by the scraper edge 232. In this way, when the ice scraper 230 is fixedly secured within the recess 224 by the interference fit between the resiliently-biased clips 225 and the side-facing surface 231C of the handle 231, a seam formed at the adjoining surfaces of the upper-facing surface 231A first plateau region and the cowl louver upper surface 221 will present a substantially imperceptible visual discontinuity. Moreover, a surface shaping defined by the cooperation of these surfaces is such that there is no substantial aerodynamic difference relative to the cowl louver upper surface 221 were no such recess 224 and ice scraper 230 present. Similarly, the surface shaping defined by the cooperation of the respective upper (that is to say, laterally inward-facing) surface of the upturned side edge 220C of the cowl louver 220 and the cooperating scraper edge 232 of the ice scraper 230 is such that similar substantially imperceptible visual discontinuities and aerodynamic continuity are present in their respective portion of the cowl louver assembly 200 as well. As such, it will be understood that such imperceptible visual discontinuities are limited in size to those that are no greater than necessary in order to form a secure fit between the ice scraper 230 and the recess 224, and as such limits such size to those that present only a small interstitial gap formed in the seam between them due to manufacturing tolerances, and that both are deemed to be within the scope of the present disclosure.

Figure 4:
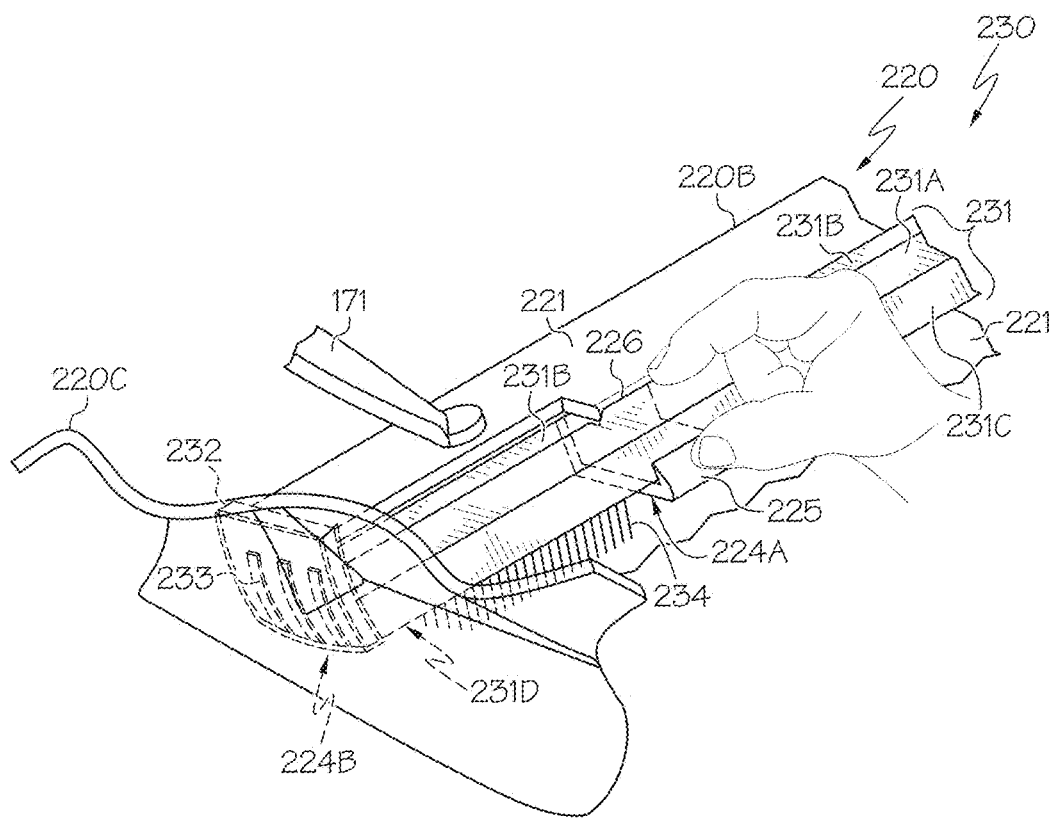
FIG. 4 depicts a detail view of the use of a clip to provide selective attachment and detachment between the modular ice scraper and the cowl louver of FIGS. 2 and 3 according to one or more embodiments shown or described herein.

Referring next to FIG. 4, a process of removal of the ice scraper 230 from the recess 224 that is formed in an upper-facing surface of the cowl louver 220 is shown. As can be seen, when the ice scraper 230 is secured to the cowl louver upper surface 221, the proximal end of the handle 231 becomes stowed within the recess 224 while the scraper edge 232 at the distal end of the handle 231 is stowed within a cutout 227 that is formed as part of the recess 224 that corresponds to an indentation formed in the laterally inward-facing surface of the upturned side edge 220C of the cowl louver 220. In one form, the recess 224 includes both the openings formed in the cowl louver upper surface 221 and the upturned side edge 220C such that both opening are contiguous with one another. Within the present context, the cutout 227 is deemed to be subsumed under the recess 224 in those ice scraper 230 configurations that possess a significantly three-dimensional shape as shown. Likewise, it will be appreciated that in another form, the ice scraper 230 may define a substantially two-dimensional profile (not shown) such that both it and the recess 224 may define a simpler structure; as such, all variations on the shape of the ice scraper 230 and the recess 224 (as well as the resiliently-biased clips 225) are deemed to be within the scope of the present disclosure.

By this construction, the ice scraper 230 is cooperative with the recess 224 and its cutout 227 to be selectively removable therefrom upon disengagement of the ice scraper 230 from the resiliently-biased clip 225. Moreover, the portion of the cowl louver upper surface 221 that is adjacent the recess 224 and the upper-facing surface 231A first plateau region of the handle 231 that is disposed within the recess 224 cooperate to define a substantially continuous, flush outward-facing fairing in the cowl louver upper surface 221. In a similar manner, when the ice scraper 230 is stored within the recess 224 such that the scraper edge 232 is nested within the cutout 227, the upward-projecting surface of the scraper edge 232 that is opposite of the surface that includes the optional ribs 233 defines a substantially continuous, flush outward-facing fairing in the portion of the cowl louver upper surface 221 that is represented by the upturned side edge 220C of cowl louver 220. In this way, the substantial entirety of the exposed surface or surfaces of the ice scraper 230 and the cowl louver upper surface 221 that is adjacent the recess 224 provide a substantially continuous visual and aerodynamic appearance when viewed from outside the vehicle 100.

The vehicular cowl louver assembly as discussed herein is configured to promote ease of use and storage of an ice scraper within an exposed vehicular component that has ease of access for a driver, passenger other person that needs to use the ice scraper. The one or more recesses formed in the cowl louver upper surface include snap-fit or related resiliently-biased features that not only permit tool-free insertion and removal of the ice scraper to and from such recess, but also provide a secure environment to ensure that the ice scraper is stored in such a way to substantially avoid rattling and related noise during movement and related operation of the vehicle. Furthermore, the cooperative construction of the ice scraper and cowl louver of the cowl louver assembly promotes a blended, faired-in shape so as to not detract from the aesthetic or aerodynamic features of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular cowl louver assembly comprising:
   a cowl louver defining at least one recess formed therein, the cowl louver assembly configured to be located between a windshield and a hood;
   a resiliently-biased clip cooperative with the at least one recess; and
   a detachable ice scraper that is selectively removable from the at least one recess through operation of the resiliently-biased clip, the detachable ice scraper comprising an elongated handle and a scraper edge located at a terminal end of the handle, the handle is narrower than the scraper edge, the scraper edge located in a recess vertical profile of the at least one recess such that the handle is recessed below the scraper edge within the at least one recess.

2. The vehicular cowl louver assembly of claim 1, wherein the resiliently-biased clip is integrally formed with the ice scraper.

3. The vehicular cowl louver assembly of claim 1, wherein the resiliently-biased clip is integrally formed with the cowl louver.

4. The vehicular cowl louver assembly of claim 3, wherein the resiliently-biased clip cooperates with the at least one recess to provide a partial closure thereof.

5. The vehicular cowl louver assembly of claim 3, wherein the resiliently-biased clip and the cowl louver comprise a synthetic resin material.

6. The vehicular cowl louver assembly of claim 1, wherein the at least one recess and the ice scraper cooperate with one another such that when the ice scraper is situated within the at least one recess, a surface of the cowl louver that is adjacent the at least one recess and a surface portion of the ice scraper that is disposed within the at least one recess cooperate to define a continuous, flush outward-facing fairing in an upper surface of the cowl louver.

7. The vehicular cowl louver assembly of claim 6, wherein the ice scraper further comprises a brush formed on a surface thereof such that when the ice scraper is situated within the at least one recess, the brush defines an inward-facing surface into the at least one recess.

8. The vehicular cowl louver assembly of claim 7, wherein the at least one recess comprises a plurality of recesses spaced along a lateral dimension of the cowl louver, each of said plurality of recesses sized and shaped to accept selective placement of the ice scraper therein.

9. The vehicular cowl louver assembly of claim 8, further comprising at least one aperture formed in each of the plurality of recesses, the at least one aperture defining a water drain.

10. The vehicular cowl louver assembly of claim 1, wherein the cowl louver further defines at least one air passage aperture to receive ambient air therethrough, the at least one aperture spaced relative to the at least one recess to define a separate location on an outward-facing surface of the cowl louver.

11. The vehicular cowl louver assembly of claim 1, further comprising a cowl panel disposed beneath the cowl louver and cooperative therewith to be secured to a vehicle.

12. The vehicular cowl louver assembly of claim 1, wherein the at least one recess comprises a plurality of sections defined by a recess horizontal profile and the recess vertical profile.

13. A vehicular windshield assembly comprising:
a windshield; and
a cowl louver assembly comprising:
 a cowl panel;
 a cowl louver that extends outward from the windshield to be adjacent a hood, the cowl louver disposed relative to the cowl panel and cooperative therewith to be secured to the windshield, the cowl louver defining at least one recess formed therein;
 a resiliently-biased clip cooperative with the at least one recess; and
 a detachable ice scraper that is selectively removable from the at least one recess through operation of the resiliently-biased clip, the detachable ice scraper comprising an elongated handle and a scraper edge located at a terminal end of the handle, the handle is narrower than the scraper edge, the scraper edge located in a recess vertical profile of the at least one recess such that the handle is recessed below the scraper edge within the at least one recess.

14. The vehicular windshield assembly of claim 13, wherein the cowl louver assembly extends across at least a majority of the windshield.

15. The vehicular windshield assembly of claim 14, wherein the at least one recess comprises two recesses spaced along a lateral dimension of the cowl louver such that each recess selectively contains a corresponding ice scraper disposed therein.

16. The vehicular windshield assembly of claim 14, wherein the recess and the ice scraper cooperate with one another such that when the ice scraper is situated within the recess, respective surfaces of both the ice scraper and the cowl louver that is adjacent the recess cooperate to define a continuous, flush outward-facing surface in the cowl louver.

17. A vehicle comprising:
a wheeled chassis with a motive power unit, guidance apparatus and a windshield that at least partially defines a passenger compartment; and
a cowl louver assembly comprising:
 a cowl panel;
 a cowl louver between a windshield and a hood, the cowl louver disposed relative to the cowl panel and cooperative therewith to be secured to at least one of the windshield and the chassis, the cowl louver defining a recess formed therein;
 a resiliently-biased clip cooperative with the recess; and
 a detachable ice scraper that is selectively removable from the recess through operation of the resiliently-biased clip, the detachable ice scraper comprising an elongated handle and a scraper edge located at a terminal end of the handle, the handle is narrower than the scraper edge, the scraper edge located in a recess vertical profile of the recess such that the handle is recessed below the scraper edge within the recess.

18. The vehicle of claim 17, wherein the resiliently-biased clip is integrally formed with at least one or the other of the ice scraper and the cowl louver.

19. The vehicle of claim 17, wherein the resiliently-biased clip is attachedly formed with at least one or the other of the ice scraper and the cowl louver.

20. The vehicle of claim 17, further comprising an additional recess defined within the cowl louver, and additional resiliently-biased clip and an additional detachable ice scraper such that the additional detachable ice scraper is selectively removable from the additional recess through operation of the additional resiliently-biased clip.

* * * * *